US006704815B1

(12) United States Patent
Morikawa et al.

(10) Patent No.: US 6,704,815 B1
(45) Date of Patent: Mar. 9, 2004

(54) INPUT-OUTPUT UNIT FOR SERIAL-PARALLEL SIGNAL CONVERSION

(75) Inventors: Fumio Morikawa, Tsukuba-gun (JP); Nobuyuki Ishitsuka, Tsukuba-gun (JP); Shinji Miyazoe, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 345 days.

(21) Appl. No.: 09/608,012

(22) Filed: Jun. 30, 2000

(30) Foreign Application Priority Data

Aug. 3, 1999 (JP) .......................................... 11-220118

(51) Int. Cl.7 ............................................... G06F 13/14

(52) U.S. Cl. ......................... 710/71; 364/132; 364/140; 364/200

(58) Field of Search ........................... 710/71; 364/132, 364/140, 200

(56) References Cited

U.S. PATENT DOCUMENTS 4,628,446 A * 12/1986 Hoffner, II .................. 364/200
5,348,047 A 9/1994 Stoll et al.
5,561,826 A * 10/1996 Davis et al. .................. 710/71
5,583,754 A * 12/1996 Leonhardt et al. .......... 364/132
5,615,106 A * 3/1997 Yashino et al. ............. 364/140
5,883,785 A 3/1999 Rohrbeck et al.
6,042,425 A 3/2000 Möller et al.

FOREIGN PATENT DOCUMENTS

EP 0 881 396 A2 2/1998

* cited by examiner

*Primary Examiner*—Abdelmoniem Elamin
(74) *Attorney, Agent, or Firm*—Oblon,Spivak, McClelland, Maier & Neustadt, P.C.

(57) ABSTRACT

An input-output unit for serial-parallel conversion has a simple structure and is capable of controlling various devices to be drive-controlled by a serial signal together or transmitting output signals from various sensors to a control system together by converting them into serial signals. For this purpose, the input-output unit has plural input-output blocks in series for inputting control signals into the various devices for transmitting output signals from the various devices, via an input-output connector, and a relay block having a serial terminal to be connected to the control system and a signal converter for converting between serial signals transmitted to and from the control system and parallel signals transmitted to and from the input-output blocks via a multipolar joint connector to be connected to each input-output block.

5 Claims, 6 Drawing Sheets

INPUT-OUTPUT UNIT FOR SERIAL-PARALLEL SIGNAL CONVERSION

TECHNICAL FIELD

The present invention relates to an input-output unit for serial-parallel conversion for performing mutual conversion between serial signals transmitted to and from a control system and parallel signals transmitted between various devices by interposing between the control system and a number of the various devices drive-controlled by the control system, such as electromagnetic valves, motors.

BACKGROUND ART

In general, when a number of various devices such as electromagnetic valves, motors are centralized-controlled, the various devices are operated with required timing by a control signal transmitted from a control system. In this case, plural devices can be readily controlled by one operation by transmitting a control signal using a serial signal from the control system.

However, in order to control the various devices by a serial signal in such a manner, it is necessary that an electronic member or the like for extracting a driving signal from the serial signal be mounted in each device and a converter for converting the serial signal into a parallel signal be provided thereon. Accordingly, it is difficult to respond on changes in the number of the devices in series.

On the other hand, there may be provided various sensors for positional sensing, operational confirmation, or the like in the devices depending on the type thereof, and in order to confirm the operational state of the device by the control system on the basis of an output signal, etc., of those sensors, it is necessary that the output signal be sequentially transmitted to the control system. The transmission by converting into a serial signal is advantageous for ready wiring rather than by wiring to the control system directly; however, the responding to changes in the number of sensors becomes a problem.

DISCLOSURE OF INVENTION

It is a technical object of the present invention to provide an input-output unit for serial-parallel signal conversion having a simple structure and being capable of controlling various devices together by a serial signal or transmitting output signals from various sensors together to a control system by converting them into serial signals.

It is another technical object of the present invention to provide an input-output unit for serial-parallel signal conversion capable of readily responding to changes in the number of various devices or sensors.

In order to solve the above-mentioned problems, an input-output unit for serial-parallel conversion according to the present invention comprises: a plurality of input-output blocks in series for inputting control signals into various devices or for transmission of output signals from the various devices; and a relay block for relaying signals between the input-output blocks and a control system, the relay block comprising a serial terminal to be connected to the control system and a signal converter for converting between serial signals transmitted to and from the control system and parallel signals transmitted to and from the input-output blocks via a multipolar joint connector to be connected to the input-output block, wherein the input-output block comprises an input-output connector for wiring to each of various devices, a multipolar male connector disposed on one coupled surface between the input-output blocks, and a multipolar female connector disposed on the other coupled surface therebetween and connected to the male connector of the adjoining input-output block or to the joint connector disposed in the relay block, and wherein the input-output connector and a terminal of the multipolar female connector are electrically connected by wiring on a printed board disposed within the input-output block while the remaining terminals in the multipolar female connector are electrically connected to terminals of the multipolar male connector.

In the input-output unit according to the present invention, each housing of the input-output blocks may be joined with each other in a state of maintaining watertightness outwardly while the input-output connector may be attached to the housing in a state of maintaining watertightness, and a required number of the input-output blocks may be detachably assembled on a mounting rail along with the relay block connected to one end of the input-output blocks and an end block connected to the other end thereof.

In the input-output unit for serial-parallel conversion having the above-mentioned structure, the relay block and the corresponding number of input-output blocks to the required number of input-output connectors are sequentially connected to each other by joining the adjoining male and female connectors together, so that the input-output unit is used by connecting each input-output connector to various devices to be controlled or various sensors for positional sensing, operational confirmation, or the like, while the control system and the serial terminal of the relay block are connected together.

When each input-output connector is connected to each kind of devices to be controlled, since a serial signal from the control system is converted to a parallel signal for each device in the signal converter of the relay block, the parallel signal in turn is transmitted to the input-output block connected to the corresponding device via the joint connector so as to be output to each device from the input-output connector, a large number of various devices can be controlled together by the serial signal.

Also, when each input-output connector is connected to each kind of sensors, since an output signal from the sensor is transmitted to the relay block via the input-output blocks so as to be output to the control system by converting it into a serial signal in the signal converter, the output signals of various sensors and so forth can be transmitted to the control system as a serial signal by combining them to one signal.

Furthermore, since the input-output blocks adjoining to each other are joined together by respective joining of the male and female connectors, the number of blocks to be connected in series can be readily changed in demand, enabling them to correspond to changes in the number of devices or sensors readily.

Also, the input-output blocks are joined together in a state of maintaining watertightness outwardly and the input-output connector is attached to the housing in a state of maintaining watertightness to thereby render the input-output unit waterproof readily.

DETAILED DESCRIPTION

Figure 1:
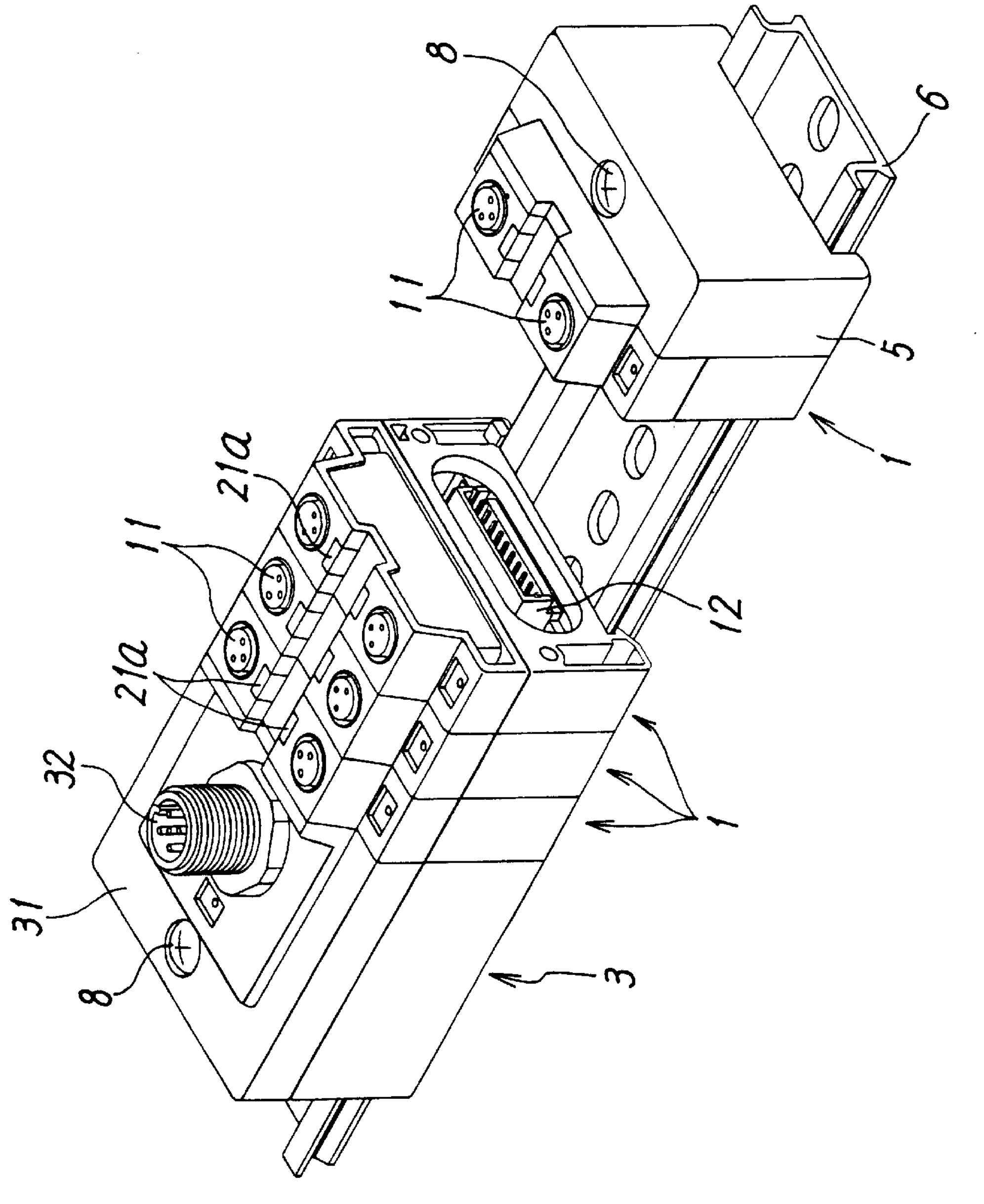
FIG. 1 is a perspective view of an input-output unit for serial-parallel signal conversion according to an embodiment of the present invention, although a part of an input-output block is omitted.

FIG. 1 shows an embodiment of an input-output unit for serial-parallel signal conversion according to the present invention. The input-output unit according to the embodiment comprises plural input-output blocks 1 for inputting a control signal into various devices or for transmitting an output signal from the various devices, a relay block 3 connected to one end of a line of the input-output blocks 1 for relaying the signal between each input-output block 1 and a control system 7 such as a controller (see FIG. 5), and an end block 5 connected to the other end of the line of the input-output block 1. The input-output blocks 1, the relay block 3, and the end block 5 are slidably mounted on a mounting rail 6 and detachably assembled thereon by respectively fixing the relay block 3 and the end block 5, which are respectively disposed on both ends of the line, to the mounting rail with fixing screws 8.

Figure 5:
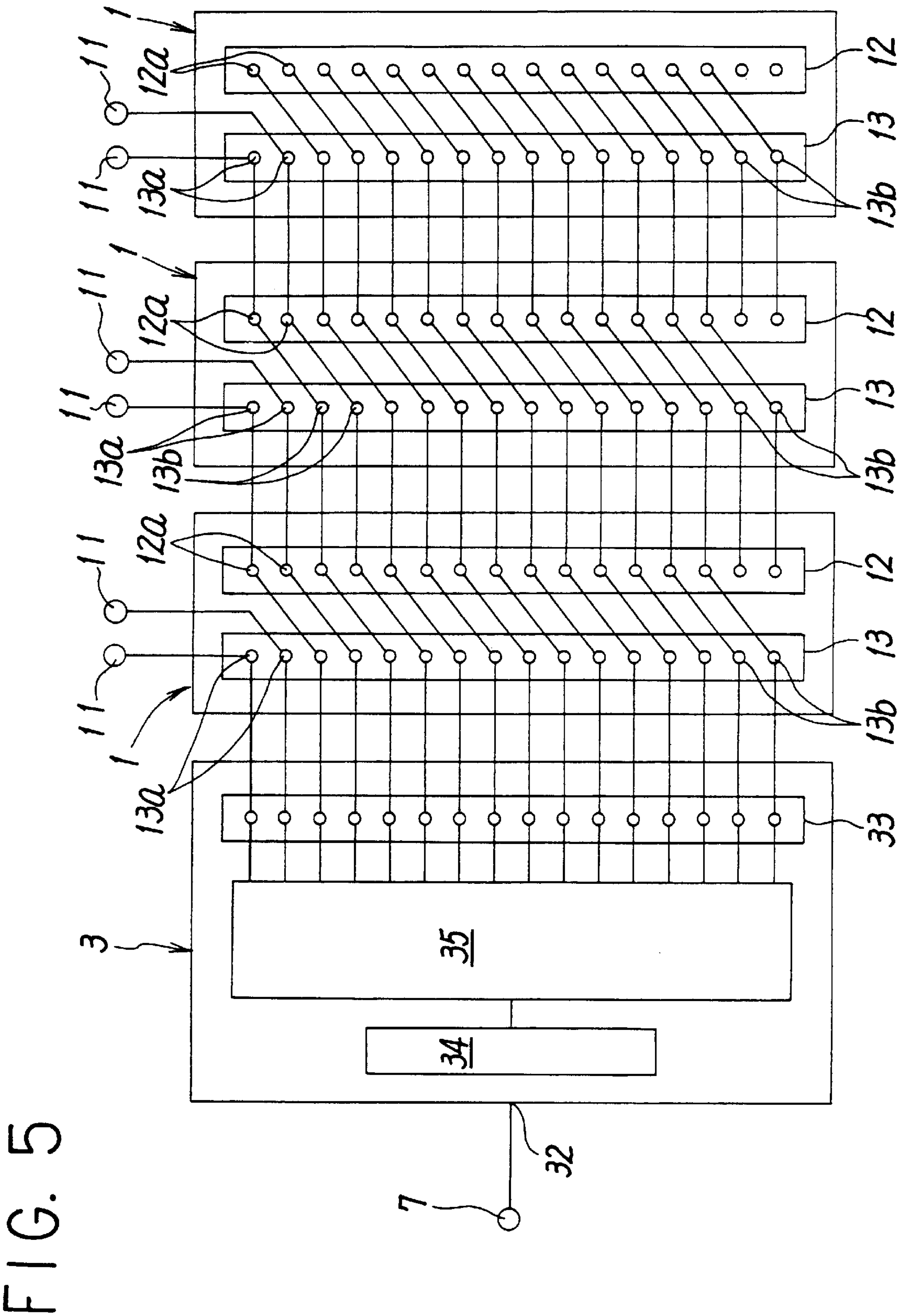
FIG. 5 is a partial circuit diagram showing an electrical coupling manner of the input-output unit for serial-parallel signal conversion according to the present invention.

As shown in FIGS. 1 and 5, the relay block 3 is provided with a serial terminal 32 disposed on the top surface of a housing 31 to be connected to the control system 7 and a multipolar joint connector 33 disposed on the coupled surface of the housing 31 to the input-output blocks 1 by opening respective connecting ports of the serial terminal 32 and the joint connector 33 outwardly.

The housing 31 has within a line transceiver 34 for relaying a serial signal to be transmitted to and from the control system via the serial terminal 32 and a signal converter 35 for converting between the serial signal and a parallel signal to be transmitted to the input-output block 1.

The electrical power for operating the various devices connected to the input-output blocks 1 and the relay block 3 itself is supplied to the relay block 3 via the serial terminal 32 along with the serial signal from the control system so as to be supplied to the input-output blocks 1 via the joint connector 33.

Figure 2:
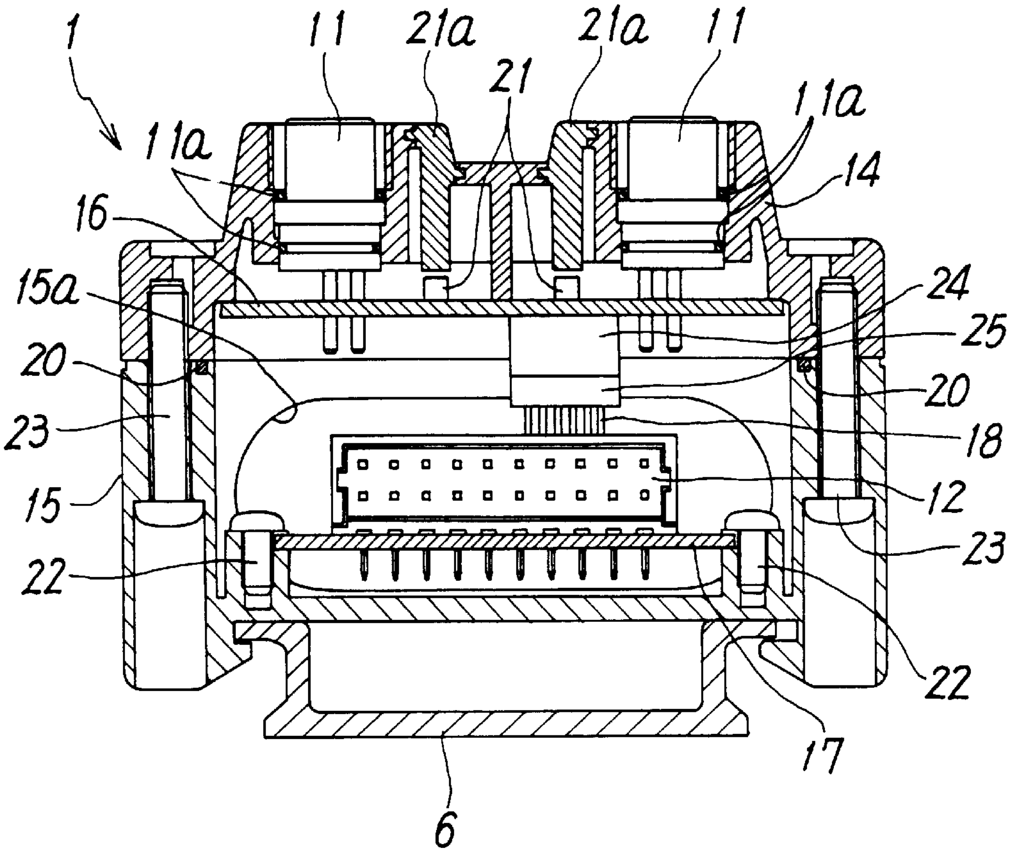
FIG. 2 is an enlarged sectional view of the input-output block according to the embodiment.
Figure 3:
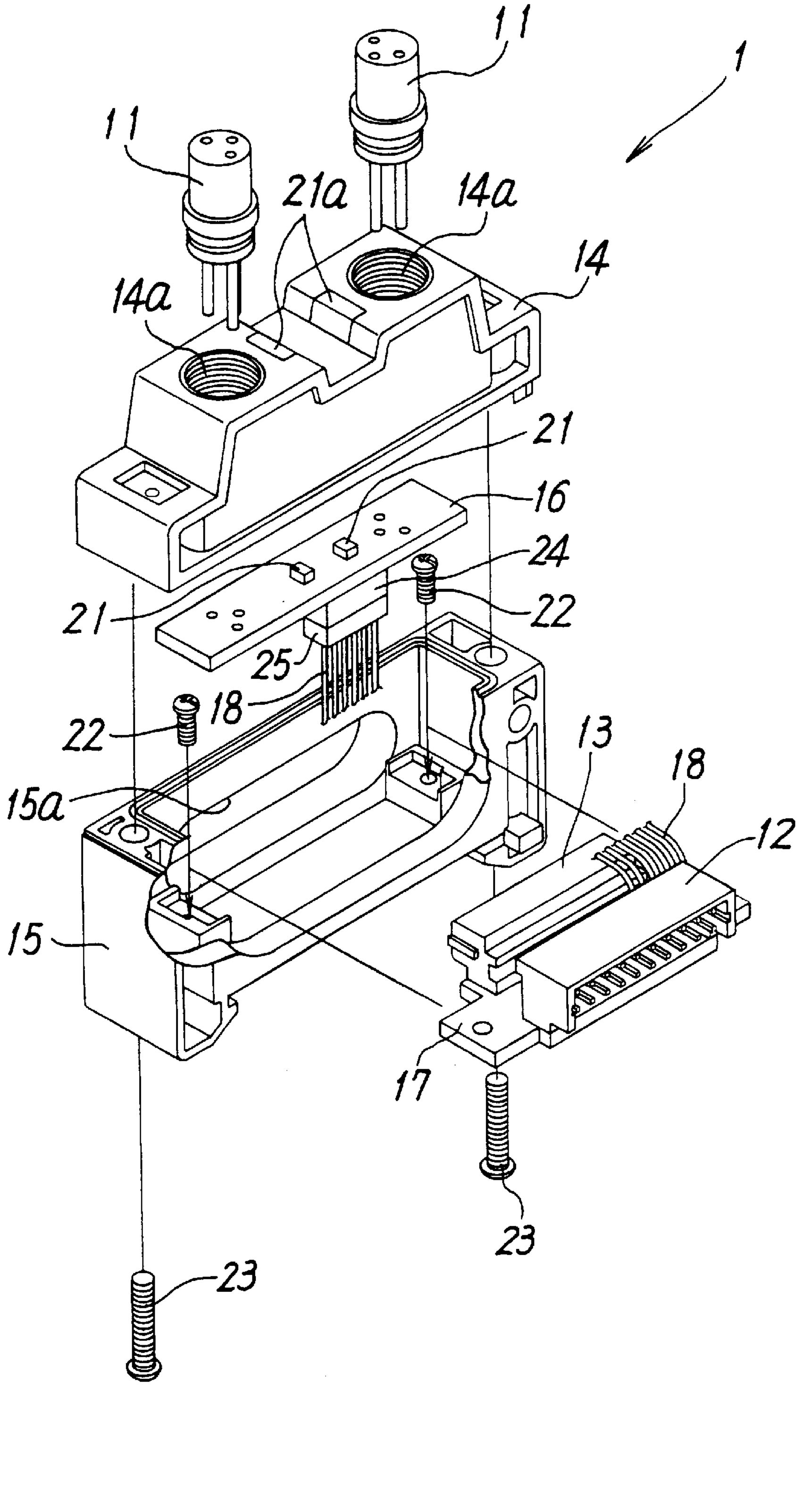
FIG. 3 is an assembly view of the input-output block shown in FIG. 2.

As shown in FIGS. 1 to 3, the input-output block 1 is provided with plural input-output connectors 11 and 11 for connecting the wiring to various devices such as an electromagnetic valve and the so forth, a multipolar male-connector 12 disposed on one coupled surface of the housing, and a multipolar female-connector 13 disposed on the other coupled surface thereof to be connected to the male-connector 12 of the adjoining input-output block 1 or the joint connector 33 of the relay block 3. The input-output connectors 11 and 11 are assembled to a first housing 14 forming the upper half part of the input-output block 1, while the male-connector 12 and the female-connector 13 are respectively assembled to a second housing 15 forming the lower half part thereof.

The input-output connectors 11 and 11 mounted on a first printed board 16 built-in the first housing 14 along with necessary electronic components such as lamps 21 and 21 for monitoring operations are fitted to fitting holes 14*a* and 14*a* on the top surface of the first housing 14 in the state that respective connecting ports of the input-output connectors 11 and 11 are opened outside. On the outer peripheral surface of the input-output connector 11, an O-ring 11*a* is fitted so that the gap to the fitting hole 14*a* of the first housing 14 is sealed to be watertight.

In addition, the numeral 21*a* represents a lamp display window made of a light-transmissive material and having an internal wall for leading the light of the lamp 21 to the top of the first housing 14.

The multipolar male-connector 12 and female-connector 13 are attached to the second housing 15 by mounting them on a second printed board 17 built-in the second housing 15 in the laterally opposite direction to each other so that connecting ports of both the connectors 12 and 13 open outwardly from coupled surfaces of the second housing 15 on the right and left, respectively. Therefore, when plural input-output blocks 1 are sequentially connected, the male-connector and the female-connector of adjoining respective blocks are connected to each other. In addition, the male-connector 12 and the joint connector 33 of the above-mentioned relay block 3 have the same shape.

The second printed board 17 is fitted within the second housing 15 along with the male-connector 12 and female-connector 13, etc., through an opening for connection 15*a* formed in the second housing 15 to be assembled thereto with fitting screws 22 and 22.

The input-output connectors 11 and 11, and the male-connector 12 and the female-connector 13 are connected as follows with wiring on the first and second printed boards 16 and 17 disposed within the input-output block 1, and conductors 18 electrically connecting between the first and second printed boards 16 and 17 via male and female relay connectors 24 and 25.

That is, as understood from FIG. 5, the input-output connectors 11 and 11, and two terminals 13*a* and 13*a* at one end of the female-connector 13 are respectively connected electrically through the conductors 18, the male and female relay connectors 24 and 25, and the printed wiring on the first printed board 16, while the remaining terminals 13*b* of the female connector 13 are connected to terminals 12*a* of the multipolar male connector 12 through the printed wiring on the second printed board 17. At this time, the above-mentioned terminals 13*b* of the female connector 13 are connected to two terminals 13*a* and 13*a* in the female connector 13 of the next-order input-output block 1 in the sequentially shifted state toward the connected direction, so that the input-output connector 11 is connected to the terminal 13*a* at one end of the female-connector 13 in any input-output block 1.

The second housing 15 is provided with the opening for connection 15*a* toward the coupled surface in which the male connector 12 is located and the connection port of the male connector 12 is exposed from the opening 15*a*.

Figure 4:
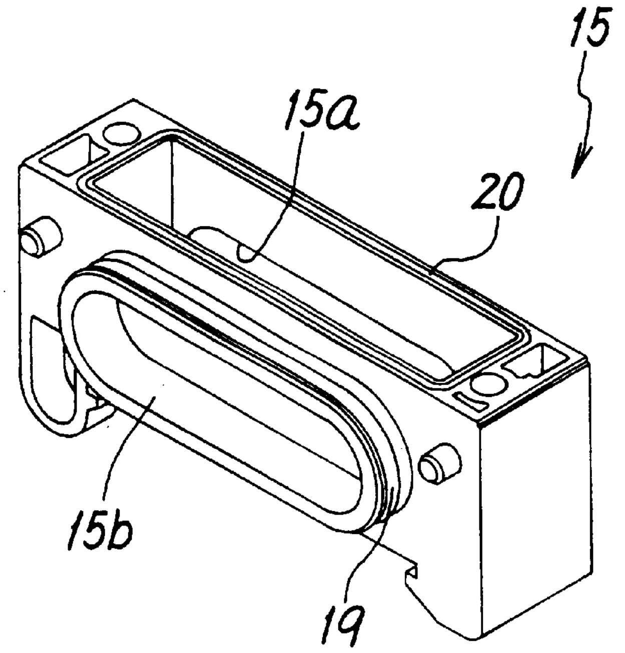
FIG. 4 is a perspective view showing a second housing of the input-output block.

On the other hand, on the coupled surface in which the female connector 13 is located, a hollow connecting cylinder 15*b* (see FIG. 4) for fitting the opening for connection 15*a* of the adjoining input-output block 1 is provided, and the connection port of the female connector 13 is exposed from the opening of the connecting cylinder 15*b*. On the external peripheral surface of the connecting cylinder 15*b*, a sealing member 19 for sealing the gap to the opening for connection 15*a* to be fitted of the adjoining input-output block 1 to be watertight.

In the second housing 15, the female connector 13 and the male connector 12 of the adjoining input-output block 1 are connected to each other by completely fitting the connecting cylinder 15*b* into the opening for connection 15*a* of the adjoining input-output block 1.

In addition, the relay block 3 is provided with the same opening as the opening for connection 15*a* for fitting the connecting cylinder 15*b* of the input-output block 1 sequentially connecting thereto so that the joint connector 33 is exposed therethrough. Also, the above-mentioned end block 5 is provided with the same connecting cylinder as the connecting cylinder 15*b* for fitting the opening for connection 15*a* of the input-output block 1 sequentially connecting thereto.

The first housing 14 and the second housing 15 are connected to each other with fixing screws 23 and 23 via a gasket member 20 for sealing the gap between the housings 14 and 15 to be watertight.

Therefore, when the required number of the input-output blocks 1 are sequentially connected by fitting the openings for connection 15*a* into the connecting cylinders 15*b* while the relay block 3 and the end block 5 are respectively attached to one end of the input-output blocks 1 and the other end thereof, owing to the functions of the O-ring 11*a*, the sealing member 19, the gasket member 20, and so forth, the housings of the input-output blocks 1 are joined together in a state of maintaining watertightness outwardly. Thereby, the input-output unit itself can be readily rendered waterproof.

In the input-output unit for serial-parallel conversion having the above-mentioned structure, the relay block 3 and the corresponding number of input-output blocks 1 to the required number of input-output connectors 11 are sequentially connected to each other by joining the adjoining male and female connectors 12 and 13 together, so that the input-output blocks 1 are connected to various devices to be controlled and various sensors for positional sensing, operational confirmation, or the like through each input-output connector 11.

When each input-output connector 11 is connected to each kind of devices to be controlled, since a serial signal from the control system is converted to a parallel signal to each device in the signal converter 35 of the relay block 3, the parallel signal in turn is transmitted to the input-output block 1 connected to the corresponding device via the joint connector so as to be output to each device from the input-output connector 11, a large number of various devices can be controlled together by the serial signal.

Also, when each input-output connector 11 is connected to each kind of sensors, since an output signal from the sensor is transmitted to the relay block 3 via the input-output blocks 1 to be output to the control system by converting it to a serial signal in the signal converter 35, the output signals of various sensors and so forth can be transmitted to the control system as a serial signal by combining them to one signal.

Furthermore, since the input-output blocks 1 adjoining to each other are joined together by joining of the male and female connectors 12 and 13, the number of blocks to be connected can be readily changed in demand, enabling them to correspond to changes in the number of devices or sensors readily.

Figure 6:
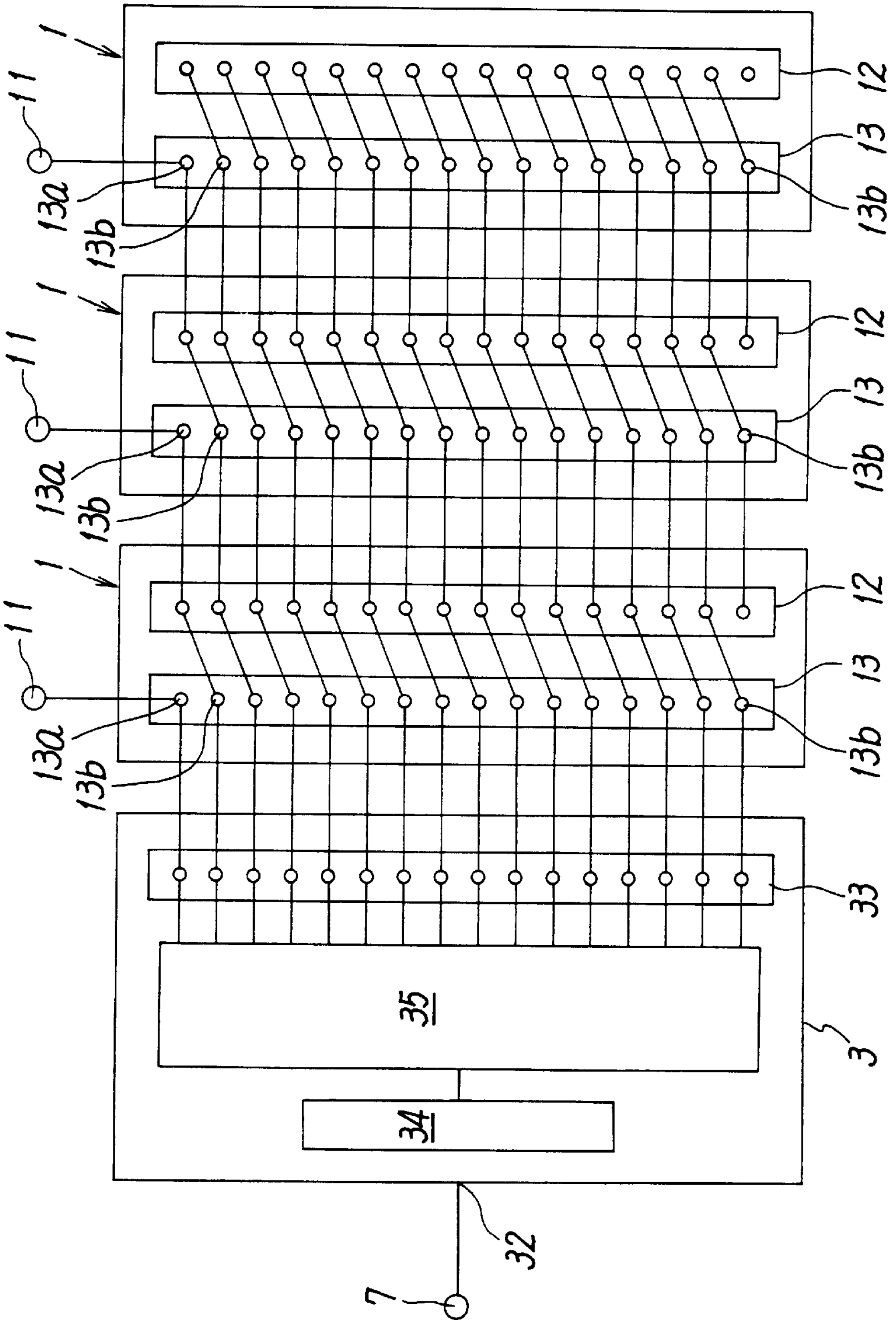
FIG. 6 is a partial circuit diagram showing an electrical coupling manner of an input-output unit for serial-parallel signal conversion according to another embodiment different from that shown in FIG. 1.

In the above-mentioned embodiment, plural input-output connectors 11 are provided in one input-output block 1; however, the number of input-output connectors 11 may be single. In this case, as shown in FIG. 6, one terminal 13*a* in terminals of the female connector 13 of the input-output block 1 is connected to an input-output connector 11 on the input-output block 1. Also, the block having plural input-output connectors 11 and the block having single input-output connector 11 may be mixed.

In addition, the other structure of the unit shown in FIG. 6 is substantially the same as that of the above-mentioned embodiment, so that like reference characters designate like portions, and description thereof is omitted.

Also, in the embodiment, one serial terminal 32 is provided in the relay block 3; however, terminals having the same shape as the serial terminal 32 may also be provided therein for transmitting or inputting a serial signal to a next-order input-output unit or various devices.

As described in detail above, according to an input-output unit for serial-parallel conversion of the present invention, when each input-output connector 11 is connected to each type of devices to be controlled, since a serial signal from the control system is converted to a parallel signal for each device in the signal converter of the relay block, the parallel signal in turn is transmitted to the input-output block connected to the corresponding device via the joint connector so as to be output to each device from the input-output connector, a large number of various devices can be controlled together by the serial signal. When each input-output connector is connected to each kind of sensors, since an output signal from the sensor is transmitted to the relay block via the input-output blocks so as to be output to the control system by converting it into a serial signal in the signal converter, the output signals of various sensors and so forth can be transmitted to the control system as a serial signal by combining them to one signal.

Furthermore, since the input-output blocks adjoining to each other are joined together by respective joining of the male and female connectors, the number of blocks to be connected in series can be readily changed in demand, enabling them to correspond to changes in the number of devices or sensors readily.

Also, the input-output blocks are joined together in a state of maintaining watertightness outwardly and the input-output connector is attached to the housing in a state of maintaining watertightness to thereby render the input-output unit waterproof readily.

What is claimed is:

1. An input-output unit for serial-parallel conversion, comprising:

a plurality of input-output blocks each detachably connected in series for one of inputting control signals into various devices and transmitting output signals from the various devices, each of the plurality of input-output blocks having at least one input-output connector for wiring to each of the various devices, a multipolar male connector disposed on a first coupling surface and a multipolar female connector disposed on a second coupling surface; and a relay block for relaying signals between the plurality of input-output blocks and a control system, said relay block having a multipolar joint connector, and a serial terminal configured to be connected to the control system, and a signal converter for converting between serial signals transmitted to and from the control system and parallel signals transmitted to and from the plurality of input-output blocks via the multipolar joint connector detachably connected to one of the plurality of input-output blocks, wherein the multipolar female connectors are configured to be connected to the multipolar male connectors, respectively, and the at least one input-output connector is electrically connected to a terminal of a respective one of the multipolar female connectors by wiring on a printed board disposed within each of the plurality of input-output blocks while remaining terminals in the respective one of the multipolar female connectors are electrically connected to terminals of a respective one of the multipolar male connectors.

2. An input-output unit according to claim 1, wherein the plurality of input-output blocks each has a housing which is joined with each other to maintain watertightness outwardly while the at least one input-output connector is attached to the housing to maintain watertightness.

3. An input-output unit according to claim 1, wherein the plurality of input-output blocks are detachably assembled on a mounting rail along with the relay block connected to one end of the plurality of input-output blocks and an end block connected to the other end thereof.

4. An input-output unit according to claim 2, wherein the plurality of input-output blocks are detachably assembled on a mounting rail along with the relay block connected to one end of the plurality of input-output blocks and an end block connected to the other end thereof.

5. An input-output unit for serial-parallel conversion, comprising:

a plurality of input-output devices each detachably connected in series for one of inputting control signals into various devices and transmitting output signals from the various devices, each of the plurality of input-output devices having at least one input-output connector configured to be connected to each of the various devices, a multipolar male connector disposed on a first coupling surface and a multipolar female connector disposed on a second coupling surface; and a relay device configured to relay signals between the plurality of input-output devices and a control system, said relay devise having a multipolar joint connector, and a serial terminal configured to be connected to the control system, and a signal converter configured to convert between serial signals transmitted to and from the control system and parallel signals transmitted to and from the plurality of input-output devices via the multipolar joint connector detachably connected to one of the plurality of input-output devices, wherein the multipolar female connectors are configured to be connected to the multipolar male connectors, respectively.

* * * * *